United States Patent
Tsubone et al.

(10) Patent No.: US 6,405,240 B1
(45) Date of Patent: Jun. 11, 2002

(54) DATA TRANSFER METHOD

(75) Inventors: Nobuhiro Tsubone; Tatsuki Ichihashi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/365,712

(22) Filed: Aug. 3, 1999

(30) Foreign Application Priority Data

Aug. 4, 1998 (JP) .......................................... 10-220000

(51) Int. Cl.[7] .............................................. G06F 13/00
(52) U.S. Cl. ...................... 709/203; 709/217; 709/223; 709/224
(58) Field of Search ................. 709/200, 201, 709/203, 217, 218, 219, 223, 224, 229, 245

(56) References Cited

U.S. PATENT DOCUMENTS

| | | | | |
|---|---|---|---|---|
| 6,173,311 B1 | * | 1/2001 | Hassett et al. | 709/202 |
| 6,185,625 B1 | * | 2/2001 | Tso et al. | 709/247 |
| 6,249,804 B1 | * | 6/2001 | Lam | 709/203 |
| 6,286,045 B1 | * | 9/2001 | Griffiths et al. | 709/224 |
| 6,292,835 B1 | * | 9/2001 | Huang et al. | 709/235 |
| 6,311,215 B1 | * | 10/2001 | Bakshi et al. | 709/221 |

FOREIGN PATENT DOCUMENTS

| JP | 8298514 | 11/1996 |
|---|---|---|
| JP | 9322123 | 12/1997 |

OTHER PUBLICATIONS

"Proxy Server," Nikkei Internet Technology, pp. 130–137, Mar., 1998.

* cited by examiner

Primary Examiner—Moustafa M. Meky
(74) Attorney, Agent, or Firm—Birch, Stewart, Kolasch & Birch, LLP (57) ABSTRACT

A proxy server located at an access point is provided with control means for separating transfer of data over an access network and transfer of data over the Internet.

5 Claims, 12 Drawing Sheets

INTERNET SERVICE PROVIDER ABC CORPORATION
HOME PAGE FOR EFFICIENTLY DOWNLOADING DATA (ADVANCE NOTICE OF DATA TRANSFER)
YOU CAN IMMEDIATELY DOWNLOAD DESIRED DATA.
DOWNLOAD

FIG. 6

INTERNET SERVICE PROVIDER ABC CORPORATION
HOME PAGE FOR EFFICIENTLY DOWNLOADING DATA (ADVANCE NOTICE OF DATA TRANSFER)
YOU WILL BE ABLE TO DOWNLOAD THE DESIRED DATA AT ABOUT 23:00.

FIG. 7

INFORMATION FROM INTERNET SERVICE PROVIDER ABC
CORPORATION HOME PAGE FOR EFFICIENTRY DOWNLOADING DATA

YOU CAN DOWNLOAD THE DESIRED DATA FROM THE FOLLOWING ADDRESS.
ABC001. dat

FIG. 8

INTERNET SERVICE PROVIDER ABC CORPORATION
HOME PAGE FOR EFFICIENTLY DOWNLOADING DATA (ADVANCE NOTICE OF DATA TRANSFER)
ACCESS TO THE DESIRED DATA ON THE PART OF OUR SERVICE IS REJECTED. WE
ARE AFRAID THAT WE MUST INSTRUCT YOU TO DIRECTLY ACCESS AND DOWNLOAD
THE DATA.

INTERNET SERVICE PROVIDER ABC CORPORATION
HOME PAGE FOR EFFICIENTLY DOWNLOADING DATA (ADVANCE NOTICE OF DATA TRANSFER)
YOU CAN DOWNLOAD DESIRED DATA FROM A HOME PAGE LOCATED AT AN ACCESS POINT. PLEASE ACCESS THE FOLLOWING ACCESS POINT AND DOWNLOAD THE DATA FROM THERE.

PHONE NUMBER OF ACCESS POINT: 03-1234-5678
HOME PAGE: http://abc.co.jp/download/data005

DATA TRANSFER METHOD

BACKGROUND OF THE INVENTION

1. Field of the Invention

The present invention relates to a method of transferring data over a computer network that includes the Internet.

2. Description of the Related Art

Figure 17:
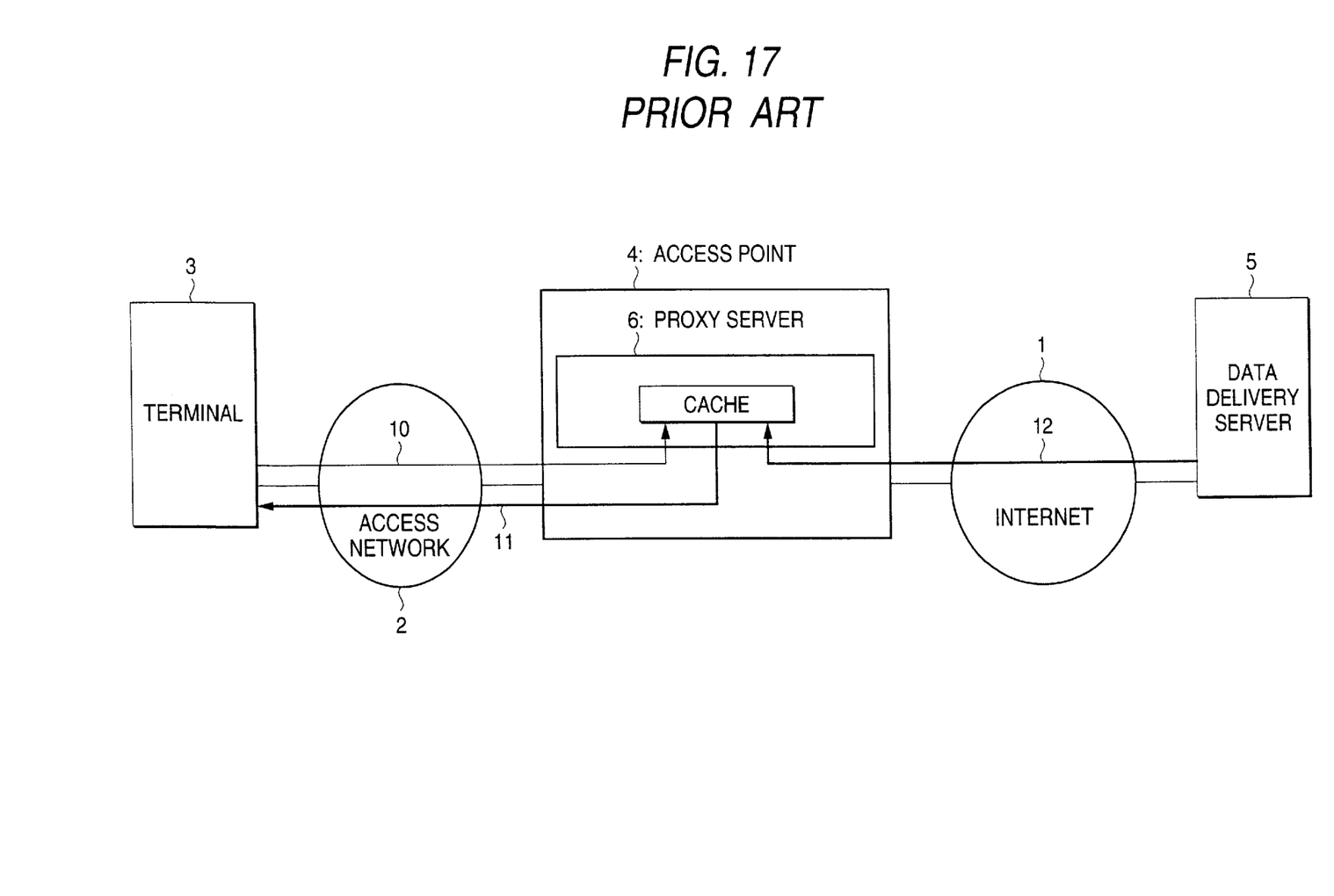
FIG. 17 is a block diagram showing a conventional data transfer method.

FIG. 17 relates to a conventional data transfer method "Proxy Server" disclosed in, e.g., Nikkei Internet Technology (pp. 130 to 137, March, 1998). Reference numeral 1 designates the Internet; 2 designates an access network including a telephone network or an ISDN; and 3 designates a terminal primarily including a personal computer. Reference numeral 4 designates an access point for connecting the Internet 1 to the access network 2 (e.g., an Internet Service Provider).

Reference numeral 5 designates a data delivery server which provides data pertaining to home pages linked to the Internet 1, shareware programs, freeware programs, and audiovisual information, etc.

Reference numeral 6 designates a proxy server which controls access to the data delivery server 5 on the part of the terminal 3. Reference numeral 10 designates an access request for accessing data stored in the data delivery server 5.

Reference numeral 11 designates a first data transfer for transferring data to the terminal 3 from the proxy server 6.

Reference numeral 12 designates a second data transfer for transferring data to the proxy server 6 from the data delivery server 5.

The operation of the conventional data transfer method will now be described by reference to FIG. 17. When accessing desired data stored in the data delivery service 5, the terminal 3 issues the access request 10 to the proxy server 6 located at the access point 4 of the ISP. Upon receipt of the access request 10, the proxy server 6 checks whether or not the desired data are cached therein. If the data are cached, the data are transferred to the terminal 3 from the proxy server 6 by means of the first data transfer 11, whereby the terminal 3 can receive the desired data. If the data are not cached, the proxy server 6 accesses the data delivery server 5 to thereby fetch the data by means of the second data transfer, simultaneously with transfer of the data to the terminal 3 by means of the first data transfer 11, with the result that the terminal 3 acquires the desired data.

As shown in FIG. 17, according to the conventional data transfer method, in a case where desired data are not cached in the proxy server 6, the proxy server 6 accesses the data delivery server 5 which holds the desired data and caches the data therein simultaneously with transmission of the data to the terminal 3. The Internet 1 has an average data transfer capability of 40 kbps or thereabouts, and data are understood to center on the Internet 1 at all times. In a case where an ISDN—use of which has recently undergone explosive growth—is used as one example of the access network 2, the transfer capability of the access network 2 assumes a value of 64 or 128 kbps, and this capability is ensured for the terminal 3 at all times.

From this fact, in a case where data are delivered directly from the data delivery server 5 connected to the Internet 1 by way of the access network 2 including the ISDN, the data are in effect transferred at an average transfer rate of 40 kbps, because the average transfer capability of the Internet 1 assumes a value of 40 kbps in spite of the fact that the access network 2 has a transfer capability of 64 or 128 kbps.

Thus, the data transfer method fails to fully utilize the data transfer capability of the access network 2. If the utilization of data transfer capability of the access network 2 cannot be maximized, the following specific problems arise.

(1) An excessive amount of time is required for transferring data, and the terminal must be powered during transfer of data. The power dissipated by the terminal is increased by an amount corresponding to the excess data transfer time.

(2) Since the excessive amount of data transfer time is required, the charges for utilizing an access network and the charges for maintaining connection with the Internet are increased by amounts corresponding to the excessive amount of data transfer time.

Accordingly, as shown in FIG. 17, in a case where the terminal 3 accesses the data stored in the data delivery server 5, if the data are not cached in the proxy server 6, there will arise a situation similar to that in which the terminal 3 downloads the data directly from the data delivery server 5 without bypassing the proxy server 6. In such a case, problems (1) and (2) arise.

The greater the amount of data to be transferred, the more noticeable the problems. Data recently delivered over the Internet including freeware programs, shareware programs, and application programs which comprise audiovisual data, assume a volume of several tens of megabytes, which is extremely large. Accordingly, solution of such a problem becomes of ever-increasing importance.

Attempts have been made to offer consumers an access network having a transfer capability on the order of megabytes per second, in forms such as an asymmetric digital subscriber line (ADSL) or a fiber to the home (FTTH). Thus, a difference between the transfer capability of the access network and the mean transfer rate of the Internet tends to increase. Even from this viewpoint, development of a data transfer method for making maximum use of the transfer capability of the access network is important.

The conventional data transfer method enables efficient transfer of data cached in the proxy server to the terminal. However, because of the concentration of data within the Internet, data not cached in the proxy server, particularly data of large volume, cannot be transferred while maximum use is made of the data transfer capability of the access network, thus incurring an increase in the power dissipated by the terminal and an increase in the communications fee.

Figure 18:
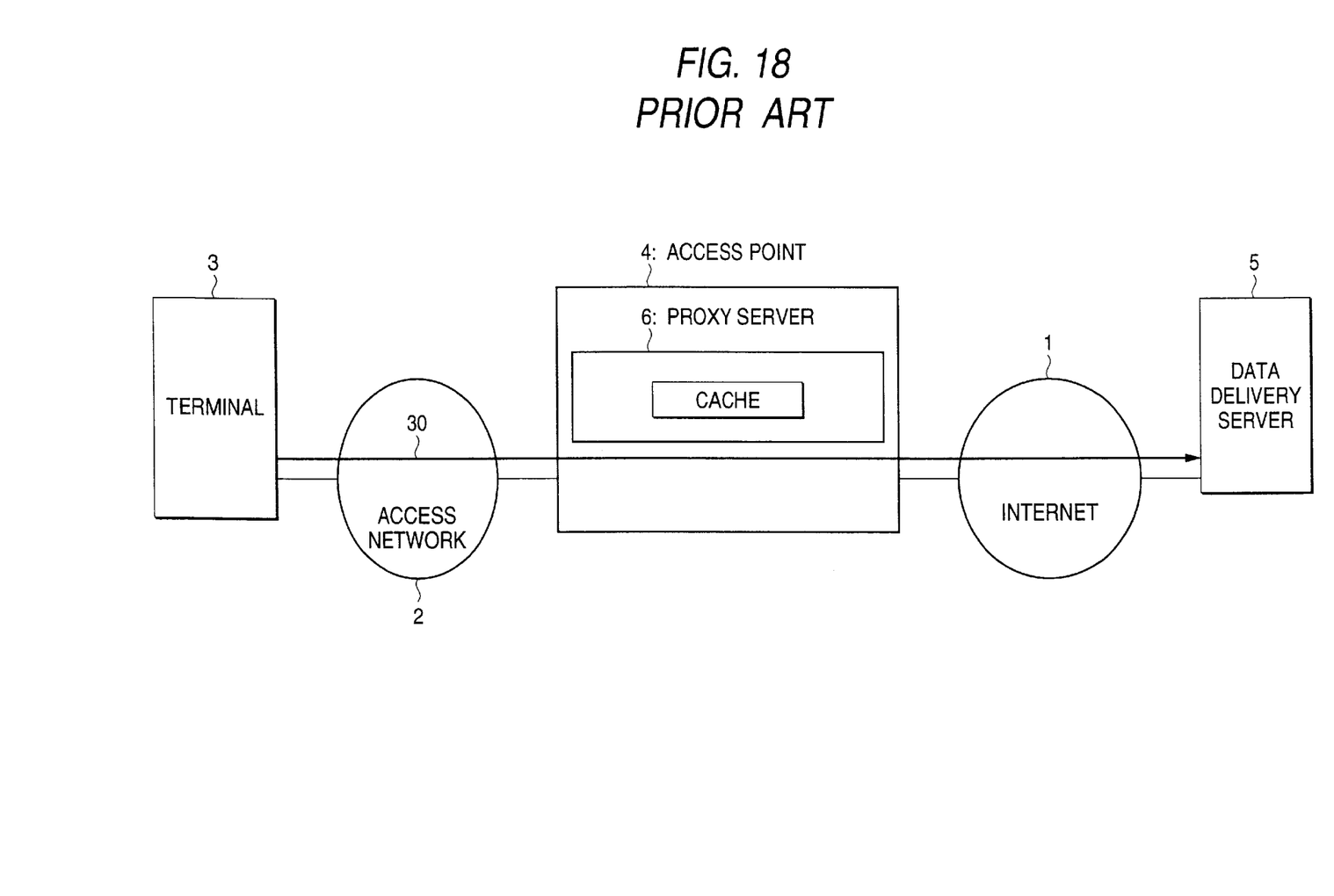
FIG. 18 is a block diagram showing a conventional data transfer method.

Further, the same problem arises even at the time of transfer of data in the reverse direction, such as that shown in FIG. 18: namely, at the time of a data transfer 30 in which data are transferred from the terminal 3 to the data delivery server 5.

SUMMARY OF THE INVENTION

The present invention has been conceived to solve the above problems, and the object of the present invention is to reduce both the power dissipated by the terminal and a communications fee by transferring data between the terminal connected to an access network and a data delivery server connected to the Internet while making maximum use of the data transfer capability of the access network.

To this end, according to a first aspect of the present invention, there is provided a data transfer method for use with a computer network including a terminal, a data delivery server, and a proxy server, the method comprising the steps that:

the terminal requests the proxy server to download data when the terminal downloads the data from the data delivery server;

the proxy server notifies the terminal that the data can be downloaded when the data are cached in the proxy server;

the proxy server downloads the data and caches the thus-downloaded data therein if the data are not cached in the proxy server; and the proxy server notifies the terminal that the data can be downloaded when caching of the data is completed. According to a second aspect of the present invention, if the data are not cached in the proxy server, the proxy server predicts a time at which the data will be transferred to and cached in the proxy server and become available for transfer to the terminal, and notifies the terminal of the thus-predicted time beforehand.

According to a third aspect of the present invention, if the data are not cached in the proxy server, the proxy server determines whether or not the data delivery server permits transfer of the data to the proxy server, before the proxy server downloads the data from the data delivery server and caches the thus-downloaded data therein, and only when the data delivery server permits transfer of the data, the data are transferred to the proxy server.

According to a fourth aspect of the present invention, if the data are not cached in the proxy server, the proxy server queries a second proxy server as to whether or not the data are cached; and, if the data are cached in the second proxy server, the proxy server notifies the terminal, without downloading the data from the second proxy server, that the data have been directly downloaded from the second proxy server, when reporting completion of downloading the data to the terminal.

According to a fifth aspect of the present invention, there is provided a data transfer method for use with a computer network including a terminal, a data delivery server, and a proxy server, the method comprising the steps that:

the terminal requests the proxy server to transfer data stored in the terminal to the data delivery service when the data are transferred from the terminal to the data delivery server;

the proxy server downloads the data and caches the thus-downloaded data therein;

the proxy server transfers the thus-cached data to the data delivery server when caching of the data is completed; and the proxy server notifies the terminal that the data have been transferred to the data delivery server when transfer of the data is completed.

DETAILED DESCRIPTION OF THE PREFERRED EMBODIMENTS

Now, a description will be given in more detail of preferred embodiments of the invention with reference to the accompanying drawings.

[First Embodiment]

Figure 1:
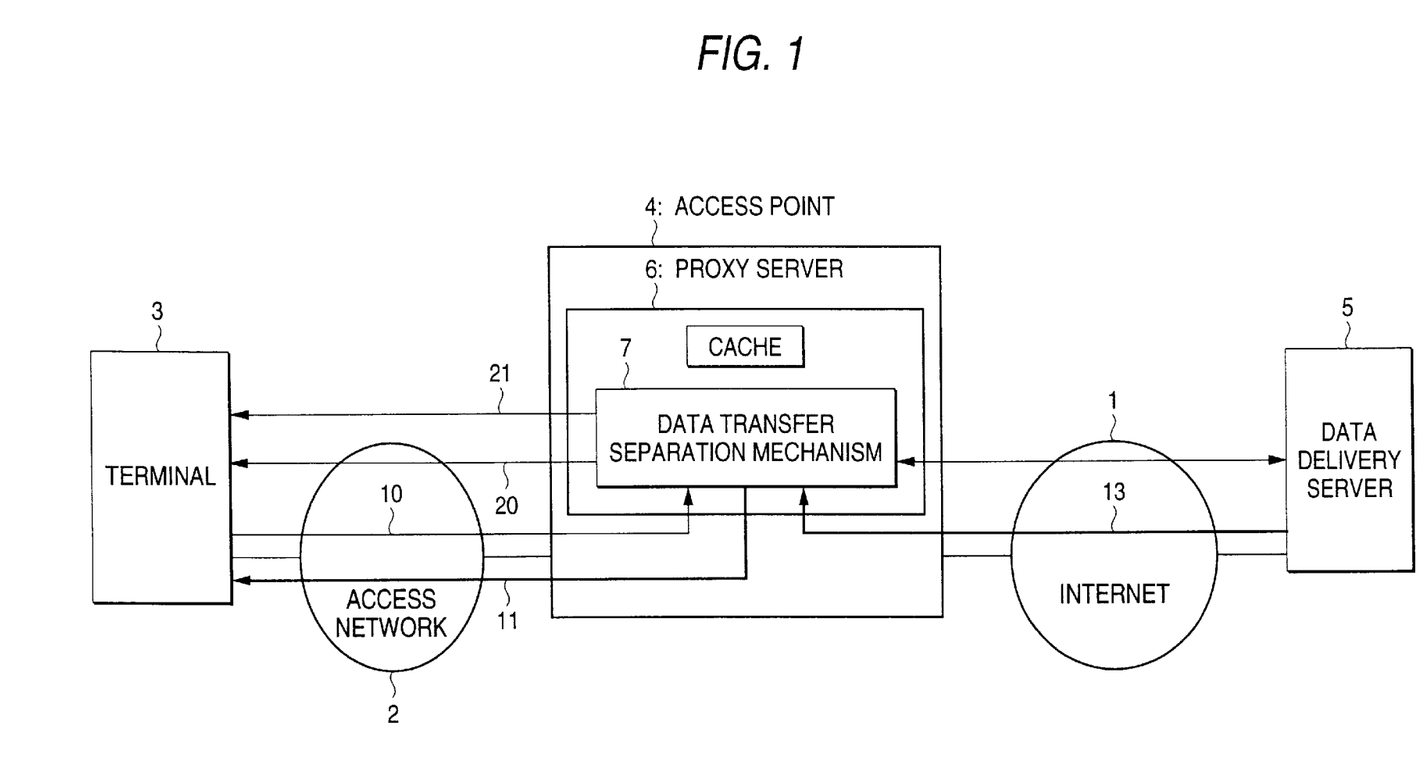
FIG. 1 is a block diagram showing a data transfer method according to a first embodiment of the present invention.

FIG. 1 is a schematic diagram showing the operation of a data transfer method according to the present invention.

In FIG. 1, reference numeral 1 designates the Internet; 2 designates an access network comprising a telephone network or an ISDN; and 3 designates a terminal primarily consisting of a personal computer.

Reference numeral 4 designates an access point of an Internet Service Provider (ISP) which connects the access network 2 to the Internet 1.

Reference numeral 5 designates a data delivery server which provides data pertaining to home pages linked to the Internet 1, shareware programs, freeware programs, and audiovisual information.

Reference numeral 6 designates a proxy server which utilizes cache memory to control access to the data delivery server 5 on the part of the terminal 3.

Reference numeral 7 designates a data transfer separation mechanism for separating transfer of data over the Internet and transfer of data over the access network. Reference numeral 10 designates an access request for accessing data stored in the data delivery server 5.

Reference numeral 11 designates a first data transfer for transferring data to the terminal 3 from the proxy server 6.

Reference numeral 12 designates a cache permission verification for determining as to whether or not the data may be transferred from the data delivery server 5 to the proxy server 6 and cached in the proxy server 6.

Reference numeral 13 designates a second data transfer for transferring data to the proxy server 6 from the data delivery server 5.

Reference numeral 20 designates an advance notice of data transfer. More specifically, prediction is made with regard to a time at which the proxy server 6 will become able to transfer to the terminal 3 the data by means of the second data transfer 13, and the thus-predicted time is reported to the terminal 3. Reference numeral 21 designates a notice of data transfer ready for notifying the terminal 3 which the proxy server 6 can transfer data to and cache the data in the proxy server 6 by means of the second data transfer 13.

Figure 2:
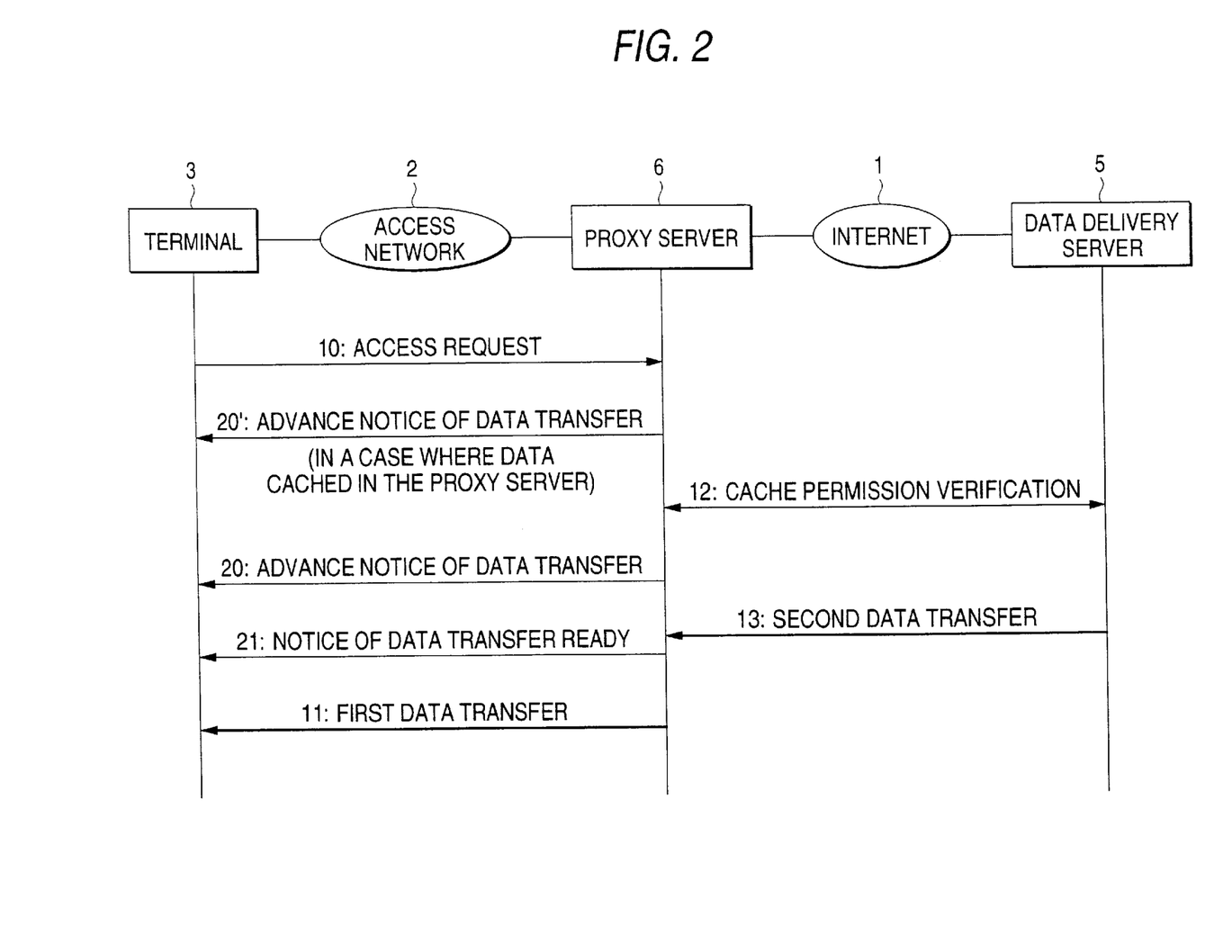
FIG. 2 is a timing chart for the data transfer method according to the first embodiment.

FIG. 2 is a timing chart for the method according to the first embodiment, and the same reference numerals as those used in FIG. 1 are provided in FIG. 2.

The operation of the data transfer method will be described by reference to FIGS. 1 and 2.

First, when accessing the data stored in the data delivery server 5, the terminal 3 issues the access request 10 to the proxy server 6 located at the access point 4 of the ISP. Upon receipt of the access request 10, the proxy server 6 checks whether or not the data are cached therein. If the data have already been cached, the proxy server 6 notifies the terminal 3 that the data are cached, by means of the advance notice 20. The terminal 3 checks the advance notice 20 and transfers the thus-cached data to the terminal 3 by means of the first data transfer 11, whereby the terminal 3 can acquire the data.

If the data are not cached in the proxy server 6, the proxy server 6 accesses the data delivery server 5 so as to query whether or not the data may be transferred to and cached in the proxy server 6, by means of the cache permission verification 12. If the data delivery server 5 permits caching of the data into the proxy server 6, the proxy server 6 predicts time at which the data will be transferred and cached in the proxy server 6 and become available for transfer to the terminal 3. The thus-predicted time is reported to the terminal 3 by means of the advance notice 20, and communication between the terminal 3 and the proxy server 6 is disabled. At this time, the terminal 3 may be powered off. Subsequently, the proxy server 6 downloads the data by means of the second data transfer 13 and caches the thus-downloaded data. Upon completion of caching of the data, the proxy server 6 notifies the terminal 3 that the transfer of data has been completed. Upon receipt of the notice of data transfer ready 21, the terminal 3 acquires the data from the proxy server 6 by means of the first data transfer 11.

If the terminal 3 is in an inactive state when the advance notice 20 arrives at the terminal 3, the terminal 3 is powered up at the time reported by means of the advance notice 20, to thereby check for arrival of the notice of data transfer ready 21. At this time, unless the notice of data transfer ready 21 is to arrive after powering of the terminal 3, the terminal 3 cannot check the arrival of the notice of data transfer ready 21. If the notice of data transfer ready 21 is implemented by means of an e-mail message, such a problem is solved.

Further, if the data delivery server 5 does not permit caching of the data pertaining to the cache permission verification 12, by means of the advance notice 20 the proxy server 6 notifies the terminal 3 that the data delivery server 5 does not permit caching of the data.

The configuration and operation of the data transfer separation mechanism 7 of the proxy server 6 will now be described.

Figure 3:
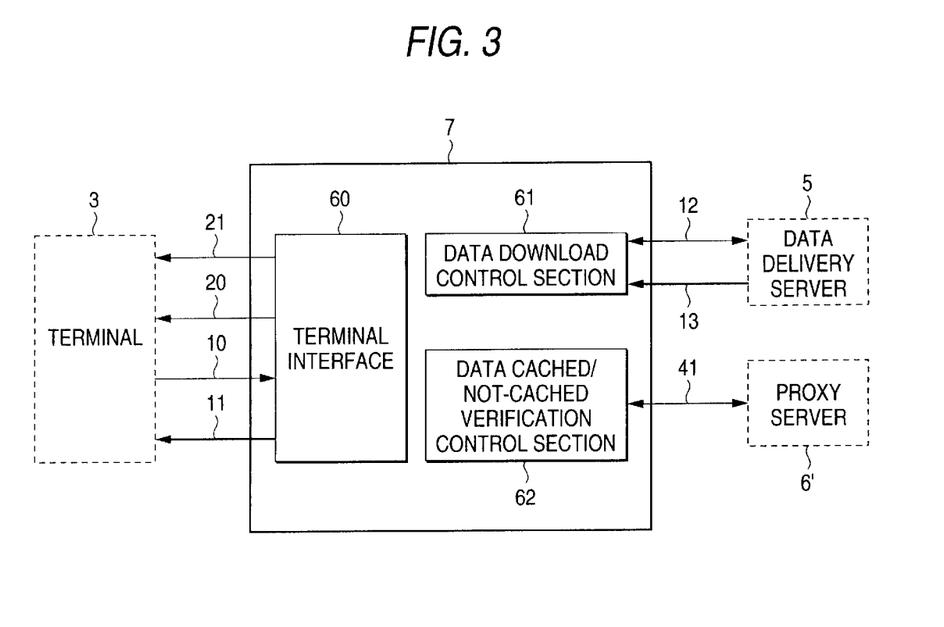
FIG. 3 is a block diagram showing the functional configuration of a data transfer separation mechanism.

FIG. 3 shows functional blocks provided in the data transfer separation mechanism 7. Reference numeral 60 designates a terminal interface which governs communication between the data transfer separation mechanism 7 and the data delivery server 5; and 62 designates a data cached/not-cached verification control section which governs communication between the data transfer separation mechanism 7 and a second proxy server 6'.

The operation of each of the functional blocks will now be described.

The terminal interface 60 communicates with the terminal 3 through use of, e.g., any of three types of protocols which are currently in widespread use in the field of Internet communication; namely, hyper text transfer protocol [(HTTP) which is the standard protocol used for accessing a home page]; file transfer protocol (FTP); and simple mail transfer protocol (SMTP).

Figure 4:
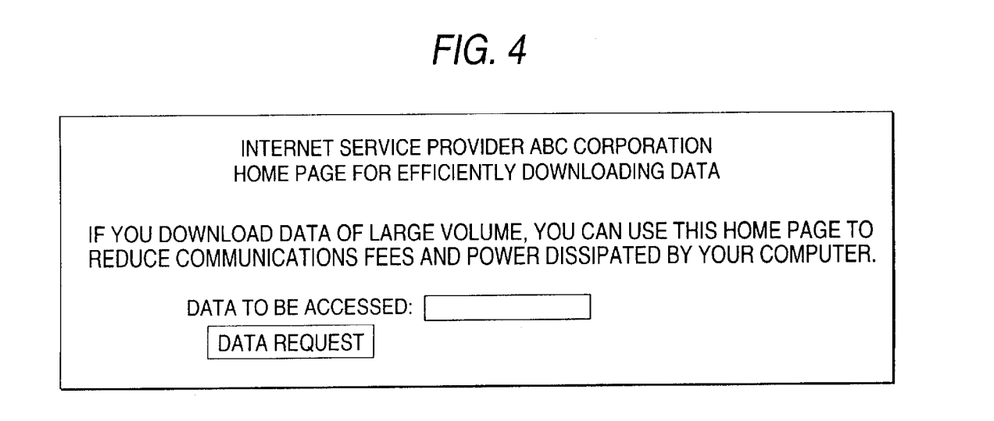
FIG. 4 shows a home page corresponding to an access request.

The access request 10 issued by the terminal 3 can be implemented by use of HTTP. More specifically, the terminal 3 communicates with the access request 10 such that a home page is usually accessed through use of a browser such as Internet Explorer (by Microsoft). In response to the access request 10, the terminal interface 60 prepares a home page, and a screen such as that shown in FIG. 4 is displayed on the browser of the terminal 3. A universal resource locator (URL). used for accessing a home page is reported to the terminal 3 from a corresponding ISP beforehand. The user of the terminal 3 enters into the column entitled "DATA TO BE ACCESSED" in the home page shown in FIG. 4 a URL pertaining to desired data and clicks a data request button. Information pertaining to the URL of the desired data is transferred to the terminal interface 60 by means of HTTP. Through the foregoing operation, the access request 10 is realized.

Figure 5:
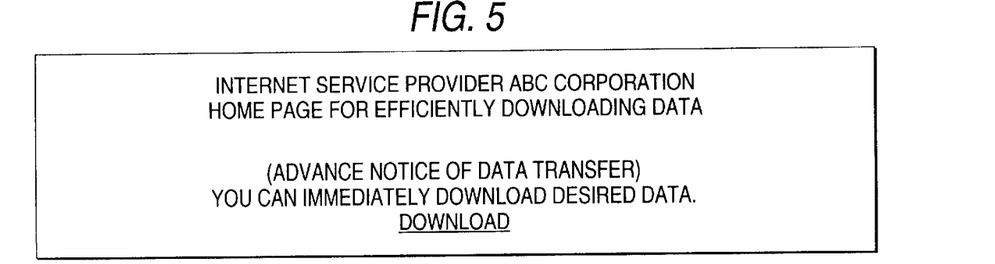
FIG. 5 shows the home page corresponding to the processing of the access request.

When receiving the URL pertaining to the desired data by means of the access request 10, the terminal interface 60 checks whether or not the data corresponding to the URL are cached therein. If the data are cached, the terminal interface 60 immediately notifies the terminal 3 that the desired data are cached in the terminal interface 60, by means of the advance notice 20. The advance notice 20 is also implemented by use of HTTP. As the result of processing of the preceding access request 10, the advance notice 20 is displayed on the browser of the terminal 3 in such a manner as shown in FIG. 5.

In contrast, if the data corresponding to the URL are not stored, the URL of the desired data is delivered to a data download control section 61.

Figure 6:
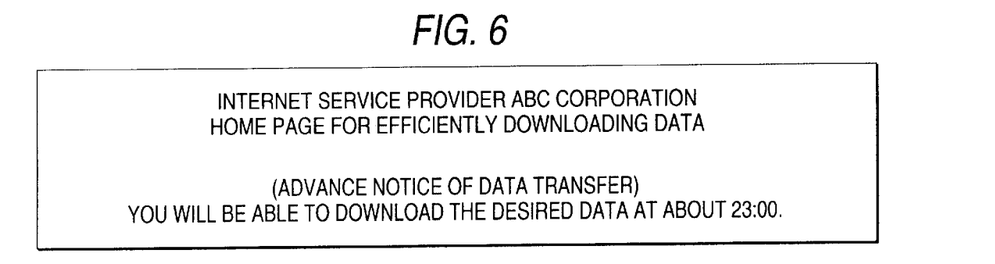
FIG. 6 shows the home page relating to an advance notice of data transfer.
Figure 7:
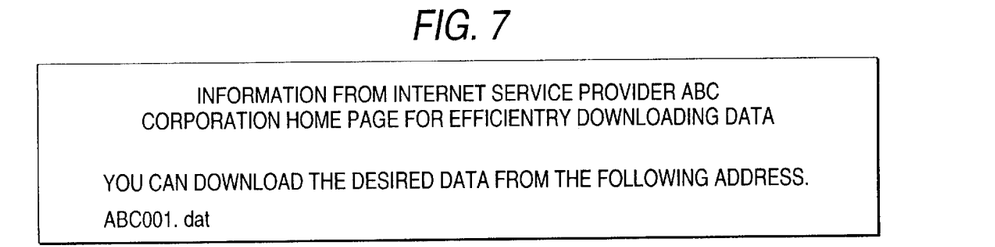
FIG. 7 shows the home page relating to an advance notice of data transfer.

Upon receipt of the URL of the desired data, the data download control section 61 queries the data delivery server 5 designated by the URL as to whether or not the data may be cached in the terminal interface 60, by means of the cache permission verification 12. If caching of the data is permitted, a prediction is made as to time at which the data will be transferred to and cached in the terminal interface 60 and become available for transfer to the terminal 3. The thus-predicted time is reported to the terminal 3 by means of the advance notice 20 implemented by HTTP. The advance notice 20 is displayed on the browser of the terminal 3, for example, in such a way as shown in FIG. 6. Further, by means of the second data transfer 13 implemented by the ftp, the proxy server 6 transfers the data to the proxy server 6 and caches the data therein. After the data have been cached in the proxy server 6, the notice of data transfer ready 21 implemented by an electronic mail system comprising the SMTP is notified to terminal 3 in a manner such as that shown in FIG. 7.

Figure 8:
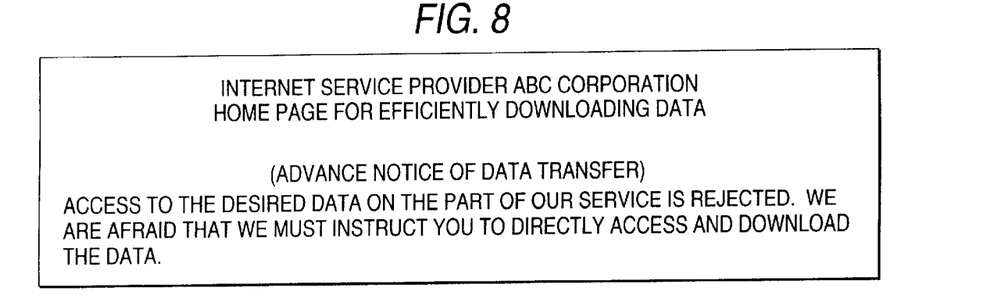
FIG. 8 shows the home page relating to an advance notice of data transfer.

If caching of the data is not permitted by means of the cache permission verification 12, the proxy server 6 notifies the terminal 3 that caching of the data is not permitted, by use of the advance notice 20 implemented by HTTP. The notice is displayed on the browser of the terminal 3 in a manner such as that shown in FIG. 8. A protocol for use in the cache permission verification 12 is arranged in advance between the proxy server 6 and the administrator of the corresponding data delivery server 5, and the processing based on the protocol is installed in the proxy server 6 and the data delivery server 5 in advance.

As mentioned above, according to the data transfer method of the present invention, in a case where the terminal accesses data stored in the data delivery server by way of the proxy server, if the data are not cached in the proxy server, the terminal is not required to communicate with the proxy server and can be powered down while the data are downloaded from the data delivery server and are cached in the proxy server. At the predicted time at which the data can be downloaded as reported by the proxy server, the server again accesses the proxy server and downloads the data. As a result, the data transfer method of the present invention can make maximum use of the transfer capability of the access network, and hence the power dissipated by the terminal and a communications fee can be diminished as compared with the case of the conventional data transfer method.

Further, according to the data transfer method of the present invention, the data delivery server is queried for permission to cache data before the proxy server downloads the data from the data delivery server and caches the thus-downloaded data therein. If the data are available at cost, access to the data can be limited.

[Second Embodiment]

The first embodiment employs a single access point. A second embodiment employs two access points, each of which comprises a single proxy server.

Figure 9:
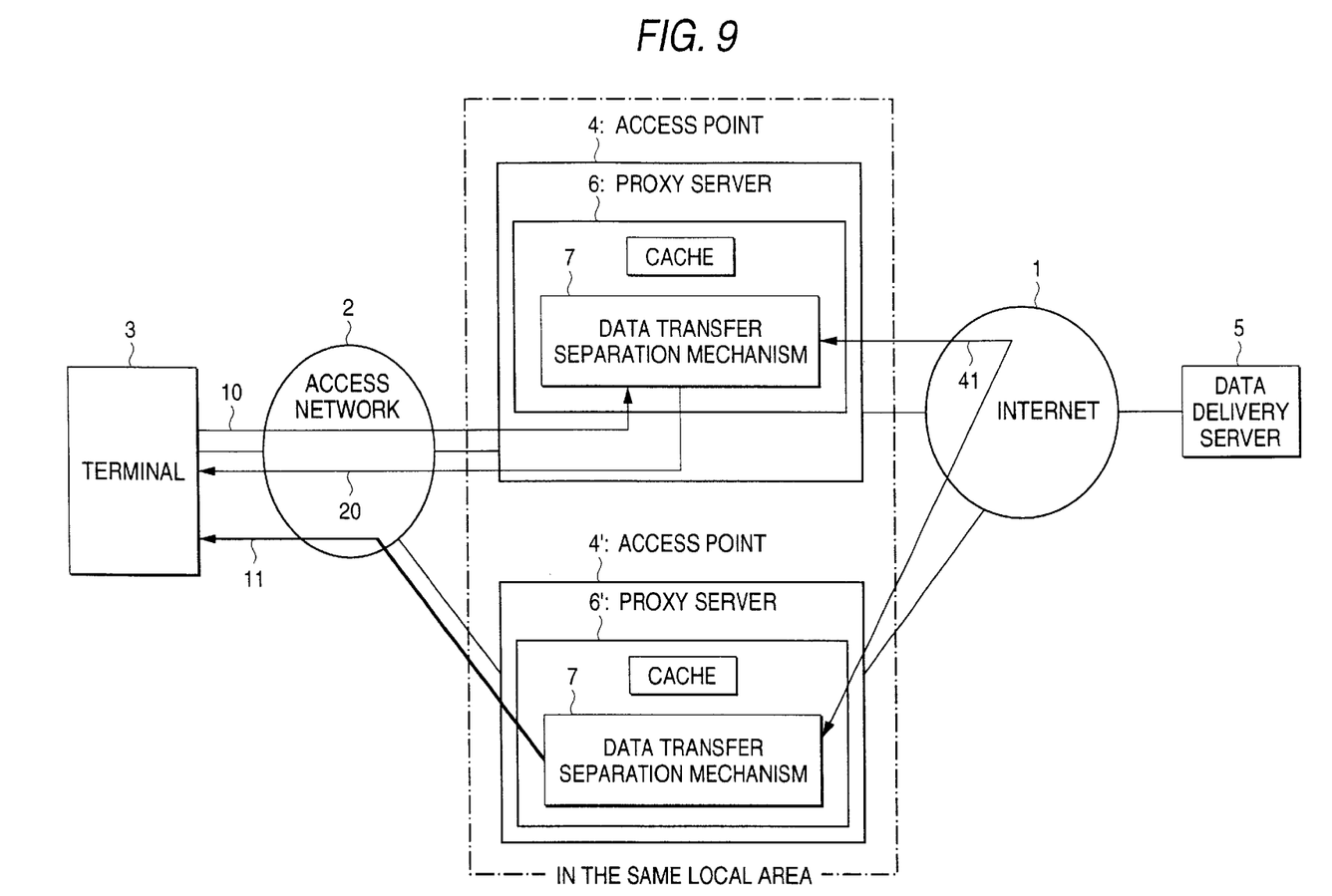
FIG. 9 is a block diagram showing a data transfer method using two proxy servers according to a second embodiment of the present invention.

In FIG. 9, reference numeral 4' designates a second access point, the first access point 4 and the second access point 4' being located within the same local area; and 6' designates a second proxy server disposed in the second access point 4'.

Reference numeral 41 designates data cached/not-cached verification for checking whether or not desired data are cached in the second proxy server 6' in the event the data are not cached in the proxy server 6.

Figure 10:
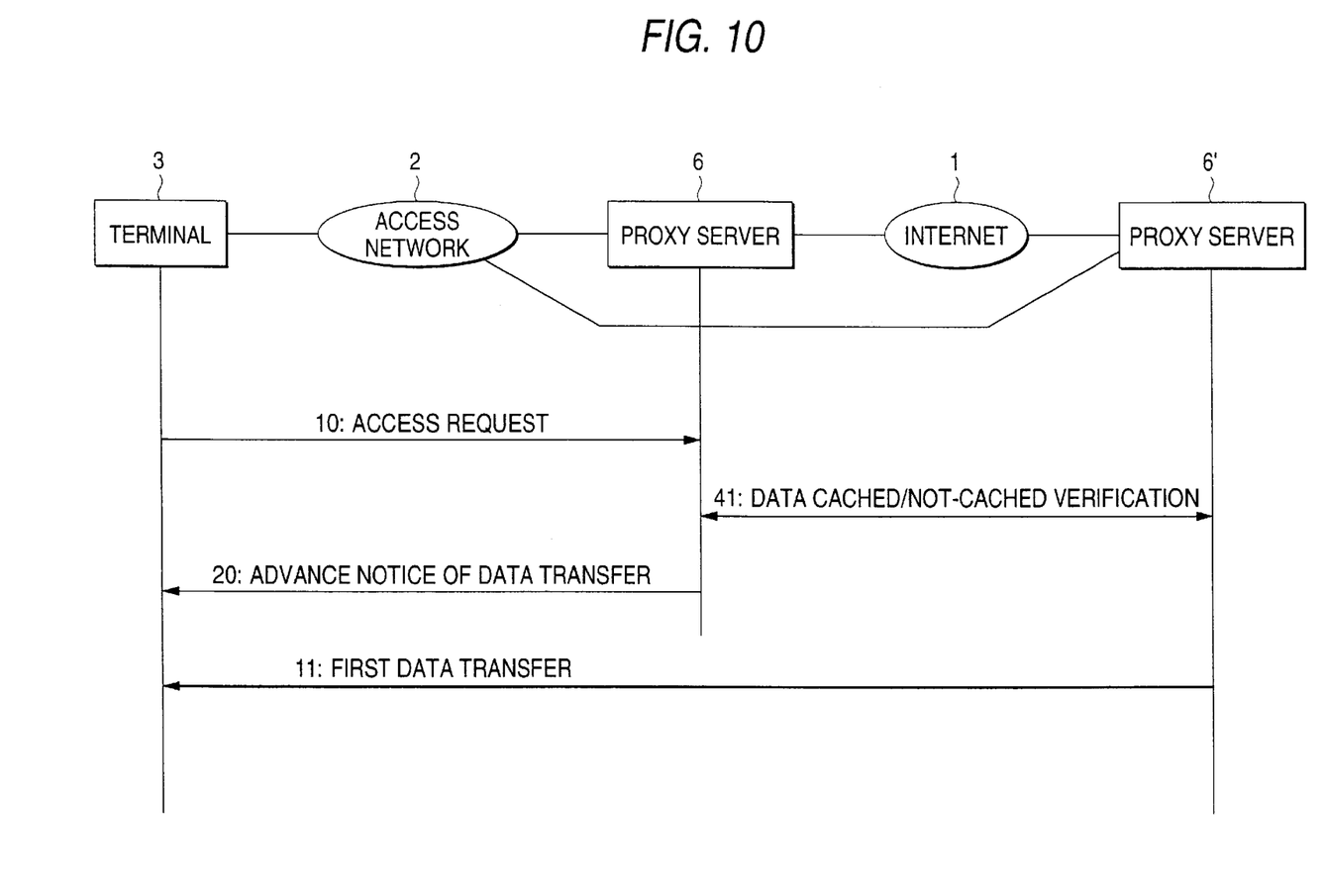
FIG. 10 is a timing chart for the data transfer method according to the second embodiment.

FIG. 10 shows a timing chart for the data transfer method according to the second embodiment, and the same reference numerals as used in FIG. 9 appear in FIG. 10.

The operation of the data transfer method according to the second embodiment will be described by reference to FIGS. 9 and 10.

As shown in the drawings, the proxy server 6 receives the access request 10. If the data requested by the terminal 3 are not cached in the proxy server 6, the proxy server 6 queries the second proxy server 6' as to whether or not the data are cached, by means of the data cached/not-cached verification 41. If the data are cached, the proxy server 6 notifies the terminal 3 that the data are stored in the second proxy server 6' disposed at the second access point 4' located within the same local area, by means of the advance notice 20. Upon receipt of the advance notice 20, the terminal 3 accesses the proxy server 6' and downloads the data by means of the first data transfer 11.

The configuration and operation of the data transfer separation mechanism 7 of the proxy server 6 according to the second embodiment will now be described.

FIG. 3 shows functional blocks provided in the data transfer separation mechanism 7. Reference numeral 60 designates a terminal interface for communicating with the terminal 3; 61 designates a data download control section for communicating with the data delivery server 5; and 62 designates a data cached/not-cached verification control section for communicating with the second proxy server 6'.

The operation of each of the functional blocks is now described.

The terminal interface 60 communicates with the terminal 3 through use of, e.g., any of three types of protocols which are currently in widespread use in the field of Internet communication; namely, hyper text transfer protocol [(HTTP) which is the standard protocol used for accessing a home page]; file transfer protocol (FTP); and simple mail transfer protocol (SMTP).

The access request 10 issued by the terminal 3 can be implemented by use of HTTP. More specifically, the terminal 3 communicates with the access request 10 such that a home page is usually accessed through use of a browser such as Internet Explorer (by Microsoft). In response to the access request 10, the terminal interface 60 prepares a home page, and a screen such as that shown in FIG. 4 is displayed on the browser of the terminal 3. A universal resource locator (URL) used for accessing a home page is reported to the terminal 3 from a corresponding ISP beforehand. The user of the terminal 3 enters into the column entitled "DATA TO BE ACCESSED" in the home page shown in FIG. 4 a URL pertaining to desired data and clicks a data request button. Information pertaining to the URL of the desired data is transferred to the terminal interface 60 by means of HTTP. Through the foregoing operation, the access request 10 is realized.

When receiving the URL pertaining to the desired data by means of the access request 10, the terminal interface 60 checks whether or not the data corresponding to the URL are cached therein. If the data are cached, the terminal interface 60 immediately notifies the terminal 3 that the desired data are cached in the terminal interface 60, by means of the advance notice 20. The advance notice 20 is also implemented by use of HTTP. As the result of processing of the preceding access request 10, the advance notice 20 is displayed on the browser of the terminal 3 in such a manner as shown in FIG. 5.

Figure 11:
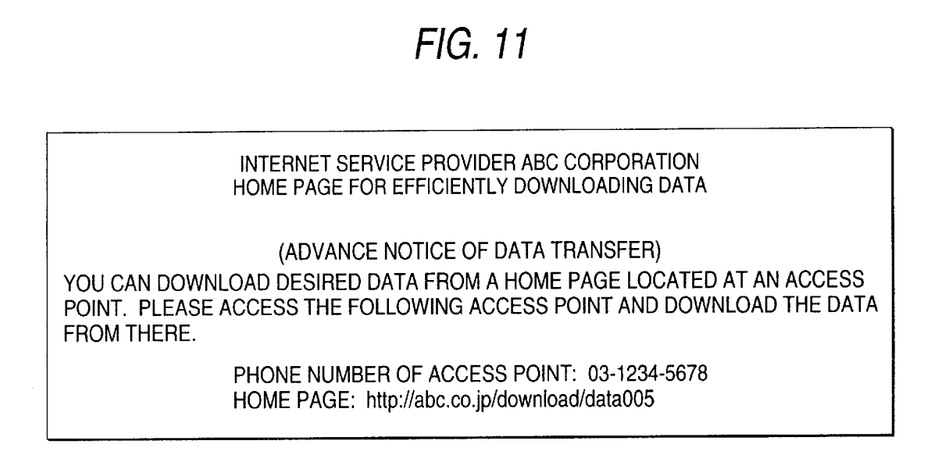
FIG. 11 shows the home page relating to an advance notice of data transfer.

In contrast, if the data corresponding to the URL are not cached, the URL of the desired data is delivered to the data cached/not-cached verification control section 62. Upon receipt of the URL of the desired data, the data cached/not-cached verification control section 62 queries the previously-registered second proxy server 6' as to whether or not the data are cached therein, by means of the data cached/not-cached verification 41. If the data are cached in the proxy server 6', the proxy server 6 notifies the terminal 3 that the terminal 3 is to directly access the second proxy server 6', by use of the advance notice 20 implemented by HTTP. At this time, the advance notice 20 is displayed on the browser in such a manner as shown in FIG. 11. If the data are not cached in the second proxy server 6', the processing performed in the first embodiment is carried out. A protocol for use in the data cached/not-cached verification 41 is arranged in advance between the administrator of the first proxy server 6 and the administrator of the second proxy server 6', and the processing based on the protocol is installed in the proxy servers 6 and 6' in advance.

As mentioned above, according to the data transfer method, in a case where the terminal accesses the data stored in the data delivery server by way of the proxy server, when the data are not cached in the first proxy server, the first proxy server checks whether or not the data are cached in the second proxy server. If the data are cached in the second proxy server, the first proxy server requests the terminal to access the second proxy server, to thereby download the data from the second proxy server. Consequently, labor required for transferring the data from the second proxy server to the first proxy server is omitted, thus preventing an increase in load exerted on the Internet in association with transfer of the data.

[Third Embodiment]

Although the first embodiment is directed to transfer of data from the data delivery server 5 to the terminal 3, the second embodiment is directed to transfer of data from the terminal 3 to the data delivery server 5.

Figure 12:
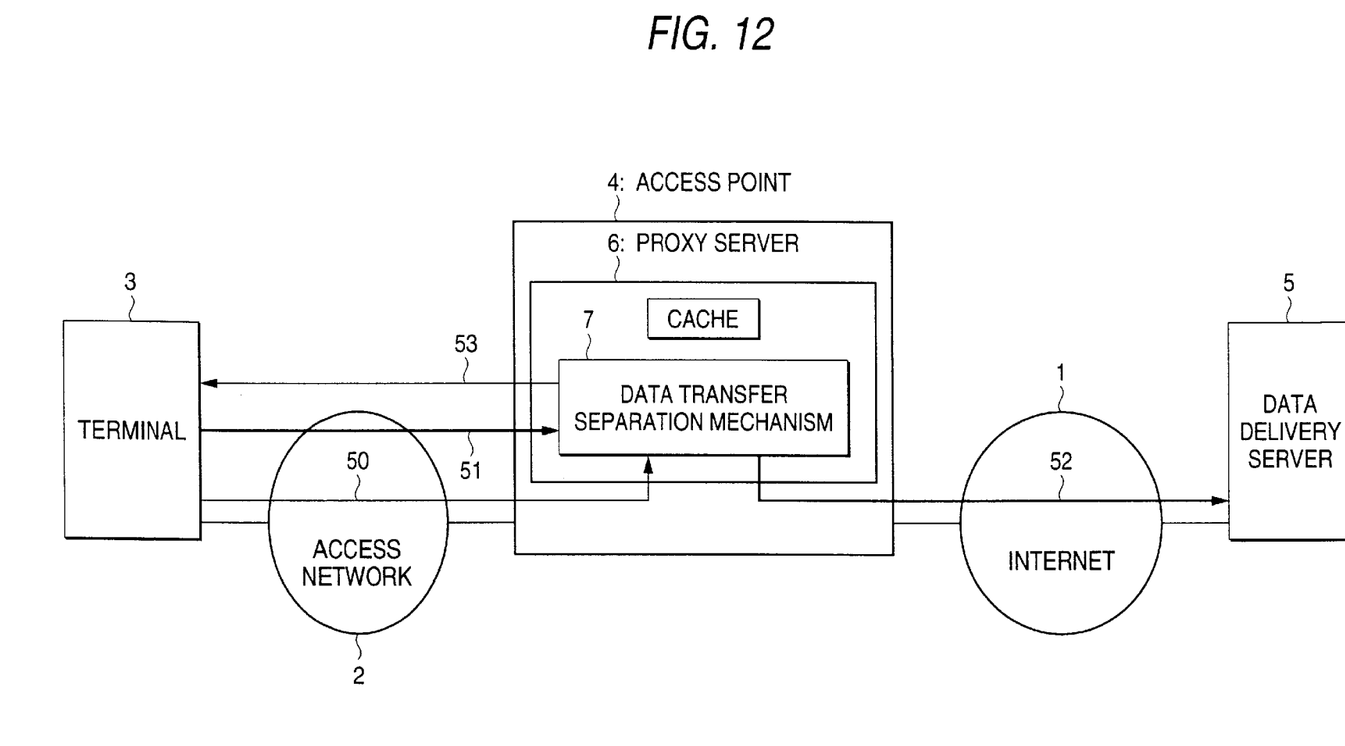
FIG. 12 is a block diagram showing a data transfer method according to a third embodiment.

In FIG. 12, reference numeral 50 designates a data transfer request which is issued to the data delivery server 5 from the terminal 3 corresponding to the proxy server 6.

Reference numeral 51 designates a third data transfer for transferring data from the terminal 3 to the data delivery server 5. Reference numeral 52 designates a fourth data transfer for transferring data from the proxy server 6 to the data delivery server 5.

Reference numeral 53 designates a data transfer completion notice for notifying the terminal 3 of completion of the fourth data transfer 52.

Figure 13:
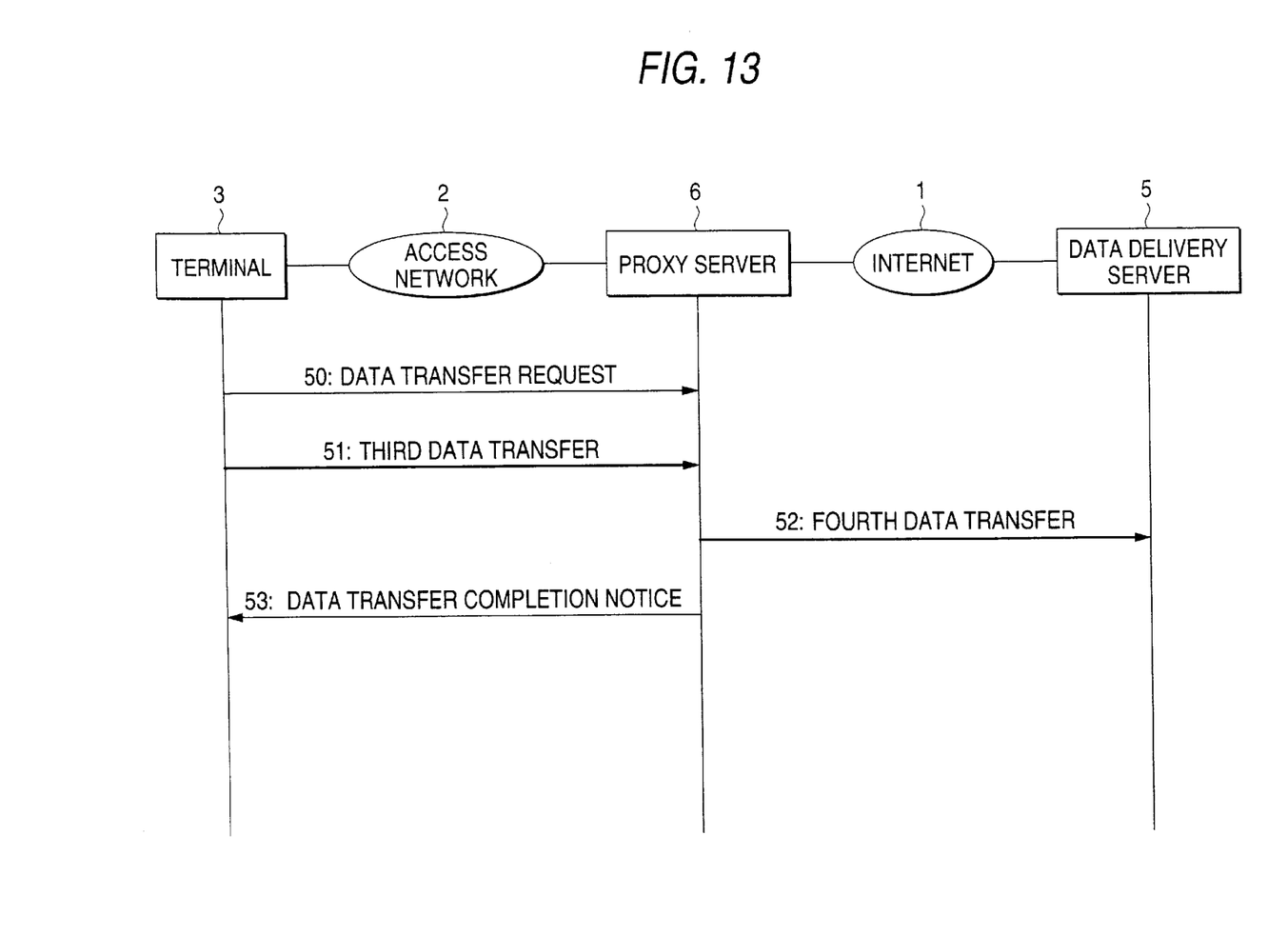
FIG. 13 is a timing chart for the data transfer method according to the third embodiment.

FIG. 13 is a timing chart for the data transfer method according to the third embodiment, and the same reference numerals as used in FIG. 12 appear in FIG. 13.

The operation of the data transfer method will be described by reference to FIGS. 12 and 13.

First, the terminal 3 terminates communication with the proxy server 6 after execution of the data transfer request 50 and the third data transfer 51. After completion of the fourth data transfer 52, the terminal 3 ascertains whether or not the data have been successfully transferred to the data delivery server 5, by means of the data transfer completion notice 53.

The configuration and operation of the data transfer separation mechanism 7 of the proxy server 6 according to the third embodiment will be described hereinbelow.

Figure 14:
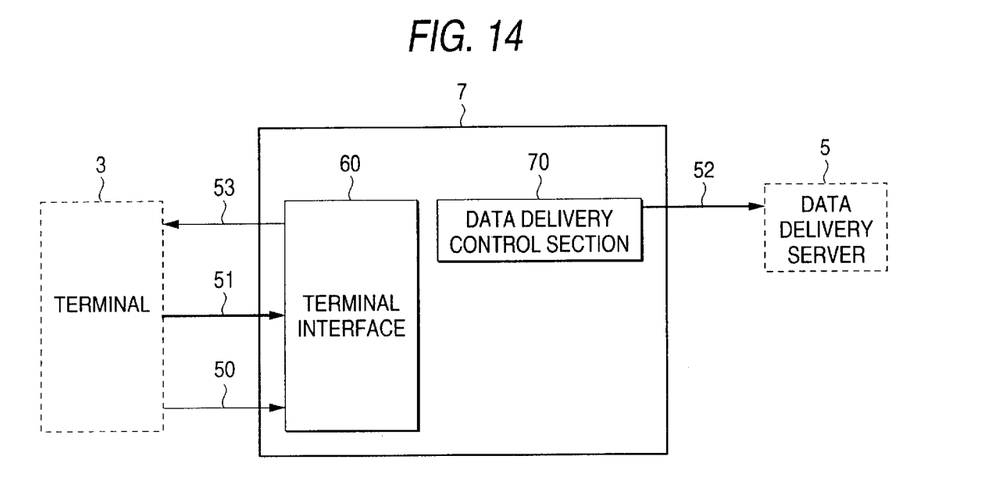
FIG. 14 is a block diagram showing the functional configuration of a data transfer separation mechanism.

FIG. 14 shows functional blocks provided in the data transfer separation mechanism 7 according to the third embodiment. Reference numeral 60 designates a terminal interface which governs communication with the terminal 3; and 70 designates a data delivery control section which governs transfer of data from the data transfer separation mechanism 7 to the data delivery server 5.

Figure 15:
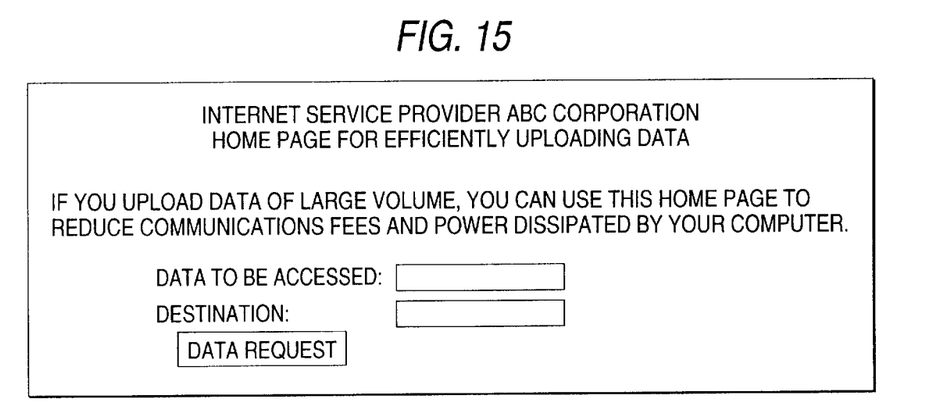
FIG. 15 shows a home page relating to a data transfer request.

As in the case of the access request 10 used in the first and second embodiments, the data transfer request 50 can be implemented through use of HTTP. Specifically, the terminal 3 effects communication of the data transfer request 50 such that a home page is usually accessed through use of a browser such as Internet Explorer (by Microsoft) In response to the data transfer request 50, the terminal interface 60 prepares a home page, and a screen such as that shown in FIG. 15 is displayed on the browser of the terminal 3. A universal resource locator (URL) used for accessing a home page is reported to the terminal 3 from a corresponding ISP beforehand.

Figure 16:
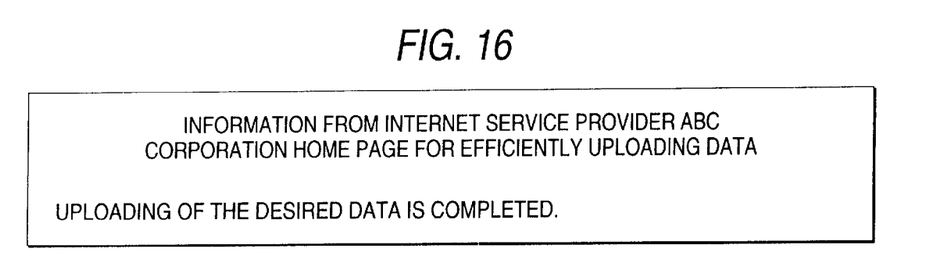
FIG. 16 shows a home page relating to a data transfer completion notice.

The user of the terminal 3 enters into the column entitled "DATA TO BE TRANSFERRED" in the home page shown in FIG. 15 a file name of data to be transferred, enters into the column entitled "DESTINATION" in the same home page a URL of the destination on the data delivery server 5, and clicks a data transfer button. The URL of the destination is transferred to the terminal interface 60 by means of HTTP. Subsequently, by means of the third data transfer 51 implemented by ftp, the data are transferred to the terminal interface 60. After completion of the third data transfer 51, the terminal interface 60 instructs the data delivery control section 70 to forward the data to the URL of the destination, and the data delivery control section 70 transfers the data to the URL of the destination and notifies the terminal interface 60 of completion of data transfer. By means of the data transfer completion notice 53 implemented by an e-mail message based on SMTP, the terminal interface 60 is notified of the data having been successfully transferred to the URL of the destination on the data delivery server 5. For example, the content of the data transfer completion notice 53 is as shown in FIG. 16.

As described above, according to the data transfer method of the present invention, in a case where the terminal transfers data to the data delivery server, the terminal once transfers data to the proxy server and terminates communication. By means of the data transfer completion notice, the terminal is notified of the data having been successfully transferred to the data delivery server. Thus, maximum use can be made of the transfer capability of the access network, thus diminishing the power dissipated by the terminal and a communications fee as compared with the case of the conventional data transfer method.

According to a first aspect of the present invention, under the data transfer method of the present invention, in a case where the terminal accesses the data stored in the data delivery server by way of the proxy server, if the data are not cached in the proxy server, the terminal does not need to communicate with the data delivery server and can also be powered off while the data are downloaded from the data delivery server and the thus-downloaded data are cached in the proxy server. Since the terminal again accesses the proxy server at a possible download reported by the proxy server, to thereby download the data. Thus, maximum use can be made of the transfer capability of the access network, thus diminishing the power dissipated by the terminal and a communications fee as compared with the case of a conventional data transfer method.

According to a second aspect of the present invention, the data delivery server is queried for permission to cache data before the proxy server downloads the data from the data delivery server and caches the thus-downloaded data therein. If the data are available at cost, access to the data can be limited.

According to a third aspect of the present invention, in a case where the terminal accesses the data stored in the data delivery server by way of the proxy server, when the data are not cached in the first proxy server, the first proxy server checks whether or not the data are cached in the second proxy server. If the data are cached in the second proxy server, the first proxy server requests the terminal to access the second proxy server, to thereby download the data from the second proxy server. Consequently, labor required for transferring the data from the second proxy server to the first proxy server is omitted, thus preventing an increase in load exerted on the Internet in association with transfer of the data.

According to a fourth aspect of the present invention, in a case where the terminal transfers data to the data delivery server, the terminal once transfers data to the proxy server and terminates communication. By means of the data transfer completion notice, the terminal is notified of the data having been successfully transferred to the data delivery server. Thus, maximum use can be made of the transfer capability of the access network, thus diminishing the power dissipated by the terminal and a communications fee as compared with the case of the conventional data transfer method.

What is claimed is:

1. A data transfer method for use with a computer network including a terminal, a data delivery server, and a proxy server, said method comprising the steps that:

the terminal requests the proxy server to download data when the terminal downloads the data from the data delivery server;

the proxy server notifies the terminal that the data can be downloaded when the data are cached in the proxy server;

the proxy server downloads the data and caches the thus-downloaded data therein if the data are not cached in the proxy server; and the proxy server notifies the terminal that the data can be downloaded when caching of the data is completed.

2. The data transfer method as defined in claim 1, wherein if the data are not cached in the proxy server, the proxy server predicts a time at which the data will be transferred to and cached in the proxy server and become available for transfer to the terminal, and notifies the terminal of the thus-predicted time beforehand.

3. The data transfer method as defined in claim 1, wherein if the data are not cached in the proxy server, the proxy server determines whether or not the data delivery server permits transfer of the data to the proxy server, before the proxy server downloads the data from the data delivery server and caches the thus-downloaded data therein, and only when the data delivery server permits transfer of the data, the data are transferred to the proxy server.

4. The data transfer method as defined in claim 1, wherein if the data are not cached in the proxy server, the proxy server queries a second proxy server as to whether or not the data are cached; and, if the data are cached in the second proxy server, the proxy server notifies the terminal, without downloading the data from the second proxy server, that the data can be directly downloaded from the second proxy server, when reporting completion of acquiring the data to the terminal.

5. A data transfer method for use with a computer network including a terminal, a data delivery server, and a proxy server, said method comprising the steps that:

the terminal requests the proxy server to transfer data stored in the terminal to the data delivery server when the data are transferred from the terminal to the data delivery server;

the proxy server downloads the data and caches the thus-downloaded data therein;

the proxy server transfers the thus-cached data to the data delivery server when caching of the data is completed; and the proxy server notifies the terminal that the data have been transferred to the data delivery server when transfer of the data is completed.

* * * * *